(12) United States Patent
Huang et al.

(10) Patent No.: US 8,854,803 B2
(45) Date of Patent: Oct. 7, 2014

(54) BUFFER ASSEMBLY AND APPLICATION METHOD THEREOF

(75) Inventors: Qun Huang, Shenzhen (CN); Che-Yu Chou, New Taipei (TW); Tai-Shan Zhu, Shenzhen (CN); Ji-Ping Wu, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 61 days.

(21) Appl. No.: 13/309,569

(22) Filed: Dec. 2, 2011

(65) Prior Publication Data

US 2012/0222807 A1 Sep. 6, 2012

(30) Foreign Application Priority Data

Mar. 3, 2011 (CN) .......................... 2011 1 0051363

(51) Int. Cl.
*B65D 81/05* (2006.01)
*B65D 85/48* (2006.01)
*G02F 1/1333* (2006.01)

(52) U.S. Cl.
CPC ............ *B65D 81/05* (2013.01); *G02F 2202/28* (2013.01); *G02F 2201/503* (2013.01); *G02F 2001/133322* (2013.01); *B65D 85/48* (2013.01); *G02F 1/133308* (2013.01)
USPC ........... 361/679.21; 349/56; 349/62; 345/173

(58) Field of Classification Search
USPC ........... 428/43, 41.8; 361/679.21; 349/58, 62; 345/173
See application file for complete search history.

(56) References Cited

U.S. PATENT DOCUMENTS

| | | | | |
|---|---|---|---|---|
| 4,390,104 A | * | 6/1983 | Cummings | 215/232 |
| 6,322,655 B1 | * | 11/2001 | Casagrande | 156/257 |
| 7,495,738 B2 | * | 2/2009 | Okuda | 349/150 |
| 2011/0255227 A1 | * | 10/2011 | Murakami | 361/679.01 |
| 2011/0317087 A1 | * | 12/2011 | Ling et al. | 349/58 |
| 2012/0188743 A1 | * | 7/2012 | Wilson et al. | 361/816 |
| 2012/0242925 A1 | * | 9/2012 | Watanabe | 349/58 |

* cited by examiner

*Primary Examiner* — Linda L Gray
(74) *Attorney, Agent, or Firm* — Novak Druce Connolly Bove + Quigg LLP

(57) ABSTRACT

A buffer assembly includes a buffer body and an adhesive layer on the buffer body. The buffer body includes a buffer portion and a mounting portion surrounding the buffer portion. The adhesive layer includes a first adhesive portion and a second adhesive portion surrounding the first adhesive portion. The first adhesive portion and the second adhesive portion respectively correspond to the buffer portion and the mounting portion. A first cutting line is disposed between the buffer portion and the mounting portion such that the mounting portion is separable from the buffer portion along the first cutting line. A second cutting line is disposed between the first adhesive portion and the second adhesive portion such that the second adhesive portion is separable from the first adhesive portion along the second cutting line. The second cutting line superposes the first cutting line.

7 Claims, 11 Drawing Sheets

BUFFER ASSEMBLY AND APPLICATION METHOD THEREOF

BACKGROUND

1. Technical Field

The present disclosure generally relates to buffer assemblies, and particularly to a buffer assembly for an electronic device and an application method of the buffer assembly.

2. Description of Related Art

Display devices, such as liquid crystal displays (LCDs), are employed in electronic apparatuses for displaying images and in many instances for providing an operational interface for a user to adjust parameters of the electronic apparatus. A display panel, such as an LCD display panel or an organic light emitting diode (OLED) display panel, is normally provided on a surface of the electronic apparatus so that people can view the images shown by the display panel conveniently. In manufacturing, the display panel is attached to the surface of the electronic apparatus. However, the display panel is liable to be damaged or abraded in the assembly process or during transportation of the electronic apparatus after its manufacture.

To overcome these problems, it is usual to have a transparent glass shell covering the display panel to prevent the display panel from being damaged or abraded, and have a buffer layer interconnecting the display panel and the transparent glass shell. To prevent the buffer layer from shading images shown on the display panel, the buffer layer should be frame-shaped and adhered to an edge area or a non-display portion of the display panel.

However, the display panel typically has a narrow border at least two sides thereof, and the buffer layer correspondingly has a small width at each of at least two sides thereof. As a result, the buffer layer is liable to become deformed, either during the process of being adhered to the display panel, or even before the adhering process is begun. Once the buffer layer has become deformed, it is difficult to accurately attach the buffer layer between the display panel and the transparent glass shell. Some gaps are liable to be formed between a surface of the buffer layer and the display panel, and/or between an opposite surface of the buffer layer and the transparent glass shell. As a consequence, the watertightness of the assembly including the display panel and the transparent glass shell may be defective, and the quality of the electronic apparatus may deteriorate rapidly over time.

What is needed, therefore, is a buffer assembly which can overcome the described shortcomings.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

Reference will now be made to the drawings to describe the preferred and exemplary embodiments in detail.

Figure 1:
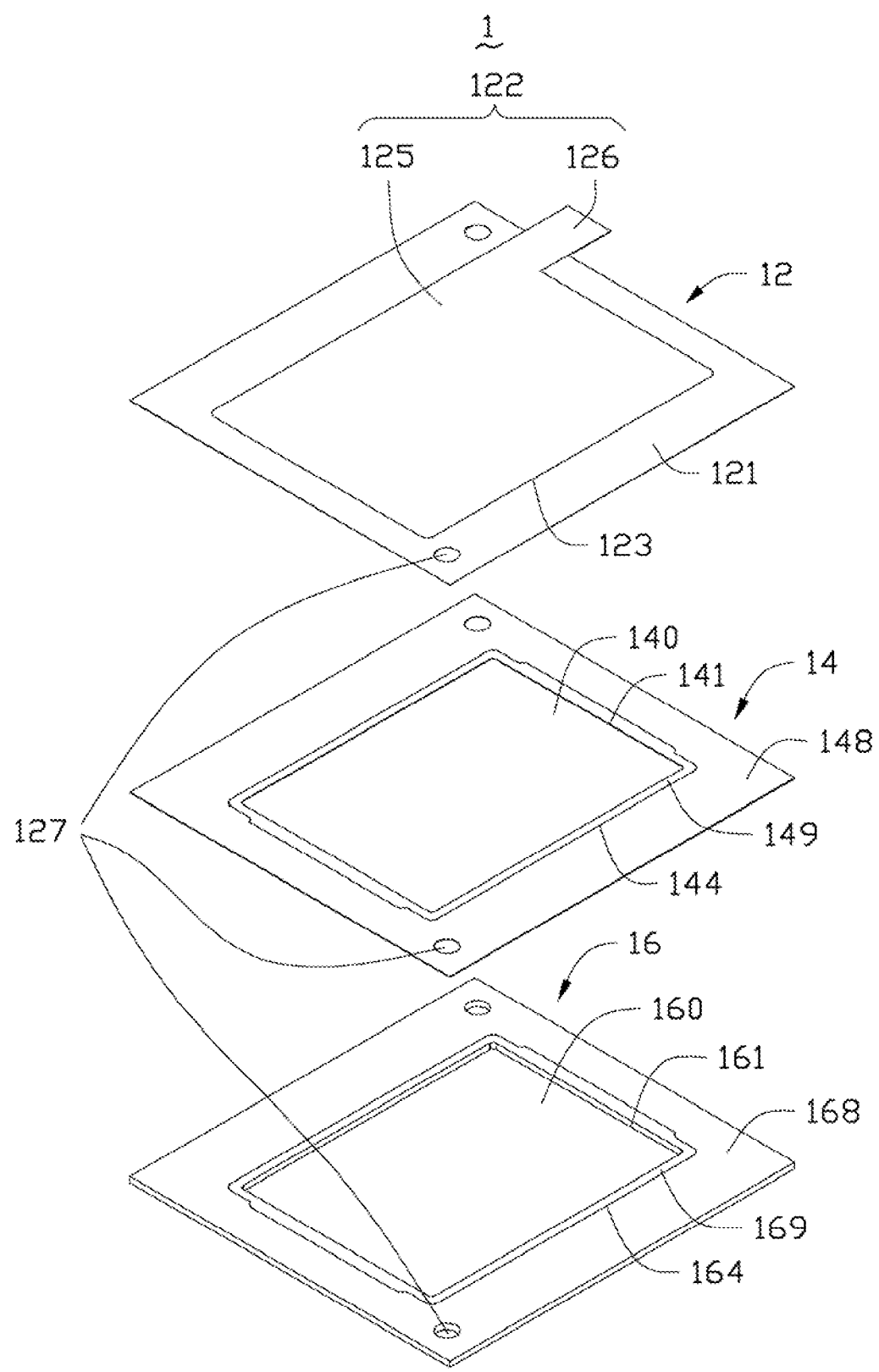
FIG. 1 is an exploded, isometric view of a buffer assembly according to one embodiment, the buffer assembly including a release paper.

Referring to FIG. 1, an exploded, isometric view of a buffer assembly 1 according to one embodiment is shown. The buffer assembly 1 includes a release paper 12, an adhesive layer 14, and a buffer body 16.

The buffer body 16 may be made of a foam material, and is substantially rectangular. The buffer body 16 includes a first opening 160 defined by an internal edge 161, a buffer portion 169 adjacent to and surrounding the first opening 160, and a mounting portion 168 adjacent to and surrounding the buffer portion 169. A first cutting line (i.e. shear line) 164 is disposed where the buffer portion 169 meets the mounting portion 168. The mounting portion 168 can be split from the buffer portion 169 easily along the first cutting line 164. When the buffer assembly 1 is to be attached to a component, such as a display panel, the first opening 160 corresponds to a display portion of the display panel, and a shape and an area of the first opening 160 substantially equal those of the display portion. The buffer portion 169 corresponds to a non-display portion or a border portion of the display panel, and a shape and an area of the buffer portion 169 substantially equal those of the non-display portion or the border portion.

The adhesive layer 14 may be a double-sided adhesive tape. The adhesive layer 14 is substantially rectangular, and matches the shape and size of the buffer body 16. The adhesive layer 14 has a configuration similar to that of the buffer body 16, and includes a second opening 140 defined by an internal edge 141, a first adhesive portion 149 adjacent to and surrounding the second opening 140, and a second adhesive portion 148 adjacent to and surrounding the first adhesive portion 149. A second cutting line (i.e. shear line) 144 is disposed where the first adhesive portion 149 meets the second adhesive portion 148. The second adhesive portion 148 can be split from the first adhesive portion 149 easily along the second cutting line 144. A shape and an area of the second opening 140 substantially equal those of the first opening 160. The second opening 140, the first adhesive portion 149, the second cutting line 144 and the second adhesive portion 148 respectively correspond to the first opening 160, the buffer portion 169, the first cutting line 164 and the mounting portion 168.

The release paper 12 includes a first release portion 122 and a second release portion 121 surrounding at least most of the first release portion 122. The first release portion 122 includes a main body 125 surrounded by the second release portion 121, and an extension end 126 extending from the main body 125 and protruding out beyond the second release portion 121. The main body 125 is substantially rectangular. The extension end 126 is provided for a user to conveniently hold and release the first release portion 122. A third cutting line (i.e. shear line) 123 is disposed between the first release portion 122 and the second release portion 121. The first release portion 122 can be split from the second release portion 121 easily along the third cutting line 123. An area of the main body 125 of the first release portion 122 is more than a sum of the areas of the second opening 140 and the first adhesive portion 149, and more than a sum of the areas of the first opening 160 and the buffer portion 169.

The first, second, and third cutting lines 164, 144, 123 are formed by a cutting blade cutting partly cutting the buffer body 16, the adhesive layer 14 and the release paper 12, respectively.

Figure 2:
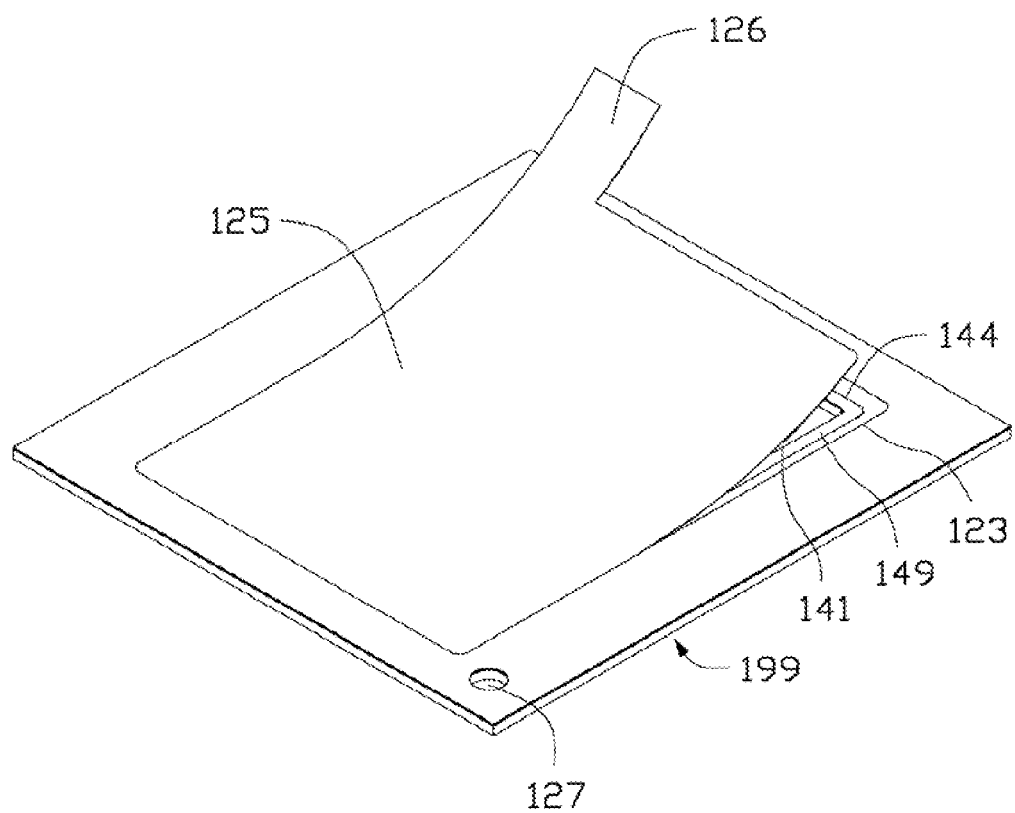
FIG. 2 is an assembled view of the buffer assembly of FIG. 1, showing a first release portion of the release paper being lifted up from the buffer assembly.
Figure 3:
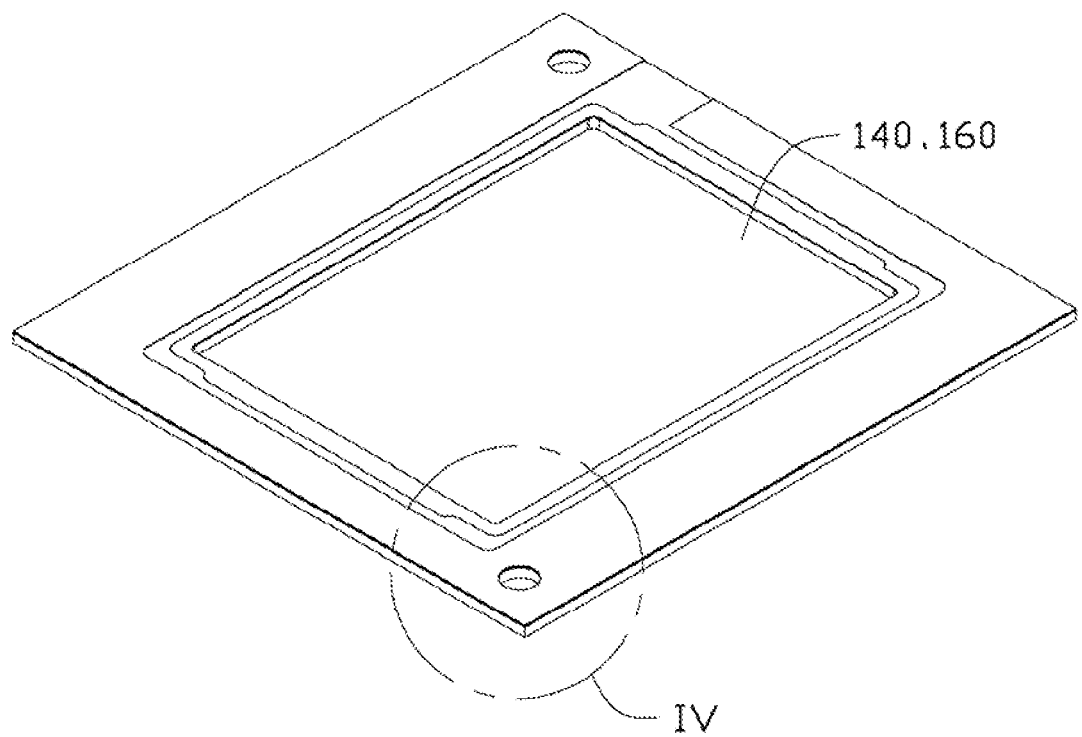
FIG. 3 is similar to FIG. 2, but showing the buffer assembly after the first release portion of the release paper has been completely removed.
Figure 4:
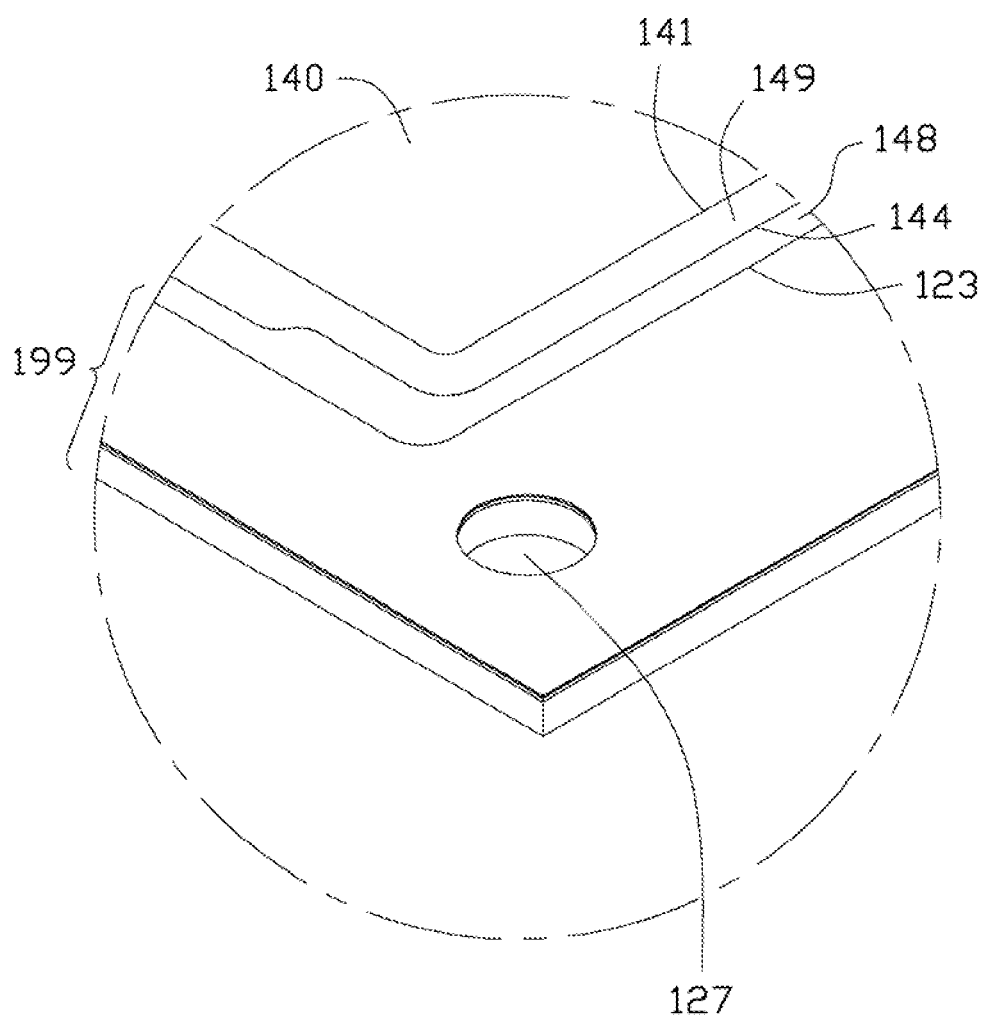
FIG. 4 is an enlarged view of a circled part IV of FIG. 3.

Referring also to FIGS. 2-4, in assembly of the buffer assembly 1, the release paper 12, the adhesive layer 14 and the buffer body 16 are arranged in that order from top to bottom. The second opening 140 corresponds to the first opening 160, the internal edge 141 of the adhesive layer 14 aligns with and superposes the internal edge 161 of the buffer body 16, and the second cutting line 144 of the adhesive layer 14 aligns with and superposes the first cutting line 164 of the buffer body 16. The release paper 12 is attached to the buffer body 16 via the adhesive layer 14. The main body 125 of the first release portion 122 completely covers the first opening 160, the second opening 140 and the first adhesive portion 149, and partly covers the second adhesive portion 148. The second release portion 121 covers part of the second adhesive portion 148. Preferably, the buffer assembly 1 is substantially rectangular, and has two position holes 127 at two diagonally opposite corners thereof. The position holes 127 are defined through the release paper 12, the adhesive layer 14 and the buffer body 16, and can be circular, triangular, square or another shape.

In this embodiment, the second release portion 121, the second adhesive portion 148, and the mounting portion 168 cooperatively define a strength enhanced portion 199. The position holes 127 are disposed in the strength enhanced portion 199. Due to the strength enhanced portion 199, a supporting strength of the buffer assembly 1 is enhanced. Therefore, when the buffer assembly 1 is adhered to a component, the buffer assembly 1 is not easily deformed.

Figure 5:
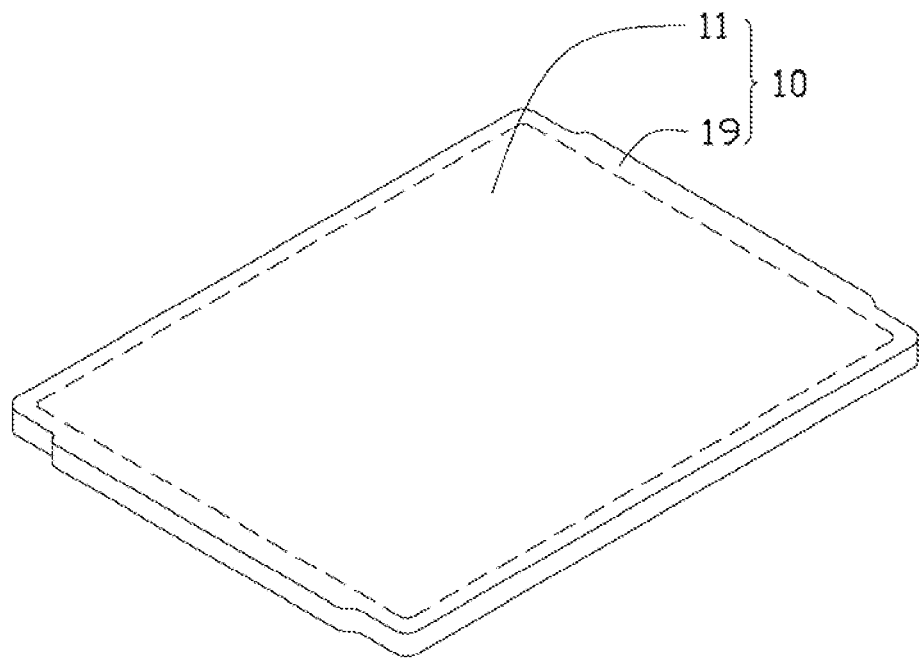
FIG. 5 is an isometric view of an exemplary display panel that can utilize the buffer assembly of the one embodiment.

A method for adhering the buffer assembly 1 to a component can be realized by a manual operation or a mechanical operation. For the purposes of describing in detail the method of adhering the buffer assembly 1 to a component, a display panel 10 is used as an example of the component. Referring to FIG. 5, an isometric view of the display panel 10 is shown. The display panel 10 includes a display portion 11, and a border portion 19 surrounding the display portion 11.

Figure 6:
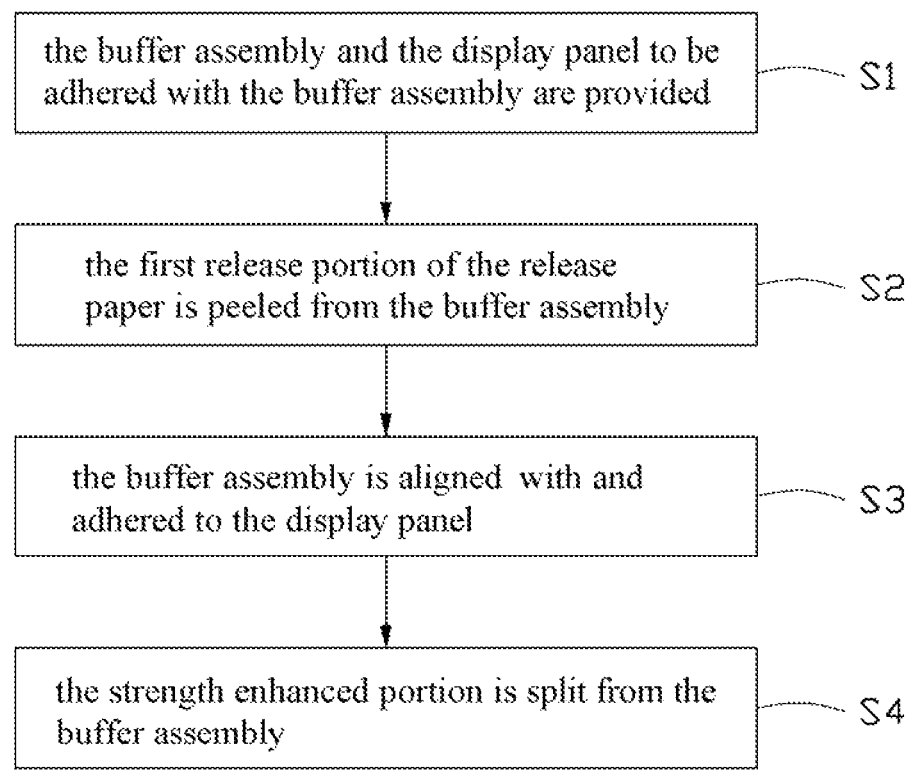
FIG. 6 is a flowchart of a first embodiment of a method for adhering the buffer assembly of the one embodiment to the display panel of FIG. 5, the method being manual.

Referring to FIG. 6, a flowchart of a method for adhering the buffer assembly 1 to the display panel 10 according to a first embodiment is shown. The method includes the following steps.

In step S1, the buffer assembly 1 and the display panel 10 to be adhered with the buffer assembly 1 are provided.

In step S2, the first release portion 122 of the release paper 12 is peeled from the buffer assembly 1. The first release portion 122 is manually peeled from the release paper 12 by holding the extension end 126, and the peeling occurs along the third cutting line 123. After the first release portion 122 has been peeled off, the first and second openings 160, 140, the first adhesive portion 149, and part of the second adhesive portion 148 are exposed.

In step S3, the buffer assembly 1 is aligned with and adhered to the display panel 10. In this embodiment, the areas of the first and the second openings 160, 140 are substantially equal to that of the display portion 11, and the area of the first adhesive portion 149 is substantially equal to that of the border portion 19. Therefore the internal edge 141 of the adhesive layer 14, the internal edge 161 of the buffer body 16, and an external edge of the display portion 11 can be aligned and matched. In this step, the buffer assembly 1 is correspondingly positioned on the display panel 10. That is, the first and the second openings 160, 140 are disposed corresponding to the display portion 11, and the first adhesive portion 149 and the buffer portion 169 are disposed corresponding to the border portion 19. An external force is applied to the buffer assembly 1 or the display panel 10, or both, for adhering the buffer assembly 1 to the display panel 10.

In step S4, the strength enhanced portion 199 is split from the buffer assembly 1. After the buffer assembly 1 is adhered to the display panel 10, the first and second cutting lines 164, 144 are superposed. The strength enhanced portion 199 is split from the buffer assembly 1 along the first and second cutting lines 164, 144 such that only the buffer portion 169 is attached to the border portion 19 of the display panel 10 via the first adhesive portion 149.

In the step of adhering the buffer assembly 1 to the display panel 10, due to the strength enhanced portion 199, the supporting strength of the buffer assembly 1 is enhanced, and the buffer assembly 1 is not easily deformed in the adhering process. After the buffer assembly 1 is adhered to the display panel 10, the strength enhanced portion 199 is split from the buffer assembly 1. Thus, accurate and tight attachment of the buffer portion 169 to the display panel 10 via the first adhesive portion 149 is achieved. Accordingly, the integrity and reliability of the display panel 10 are improved.

Figure 7:
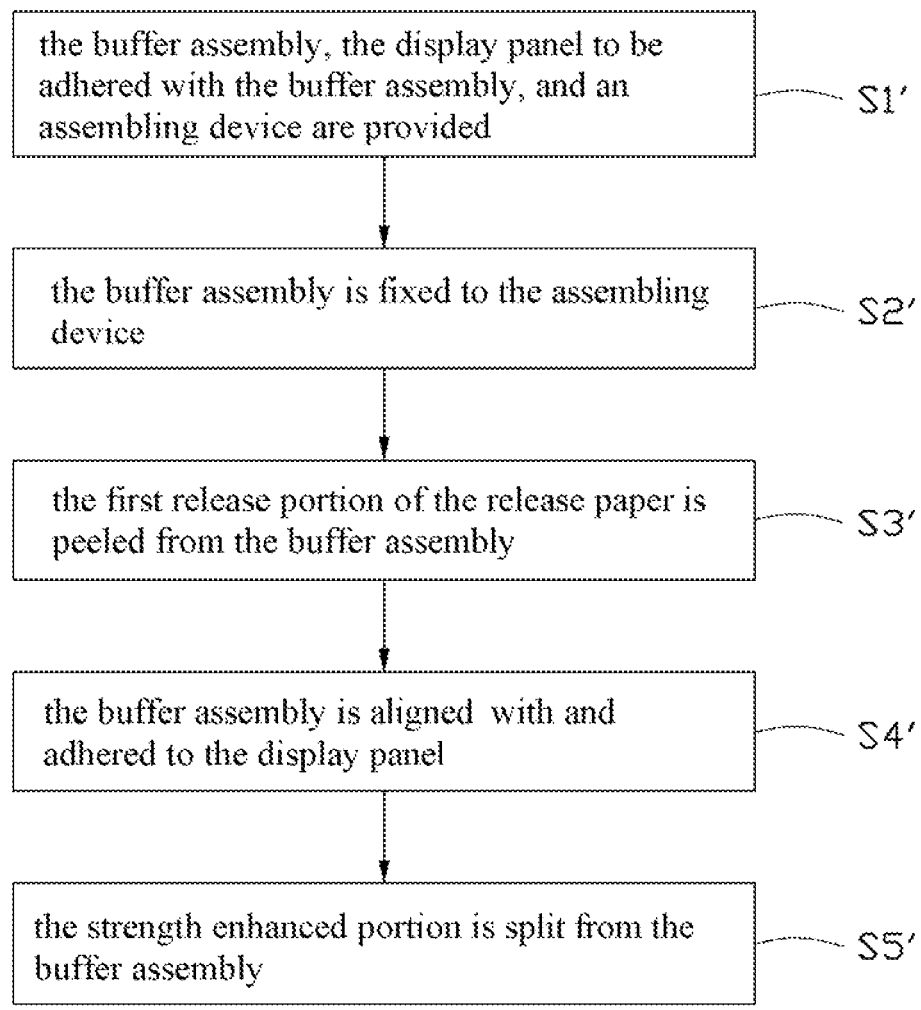
FIG. 7 is a flowchart of a second embodiment of a method for adhering the buffer assembly of the one embodiment to the display panel of FIG. 5, the method utilizing an assembling device.

Referring to FIG. 7, a flowchart of a method for adhering the buffer assembly 1 to the display panel 10 according to a second embodiment is shown. The method includes the following steps.

In step S1', the buffer assembly 1, the display panel 10 to be adhered with the buffer assembly 1, and an assembling device 3 are provided.

Figure 8:
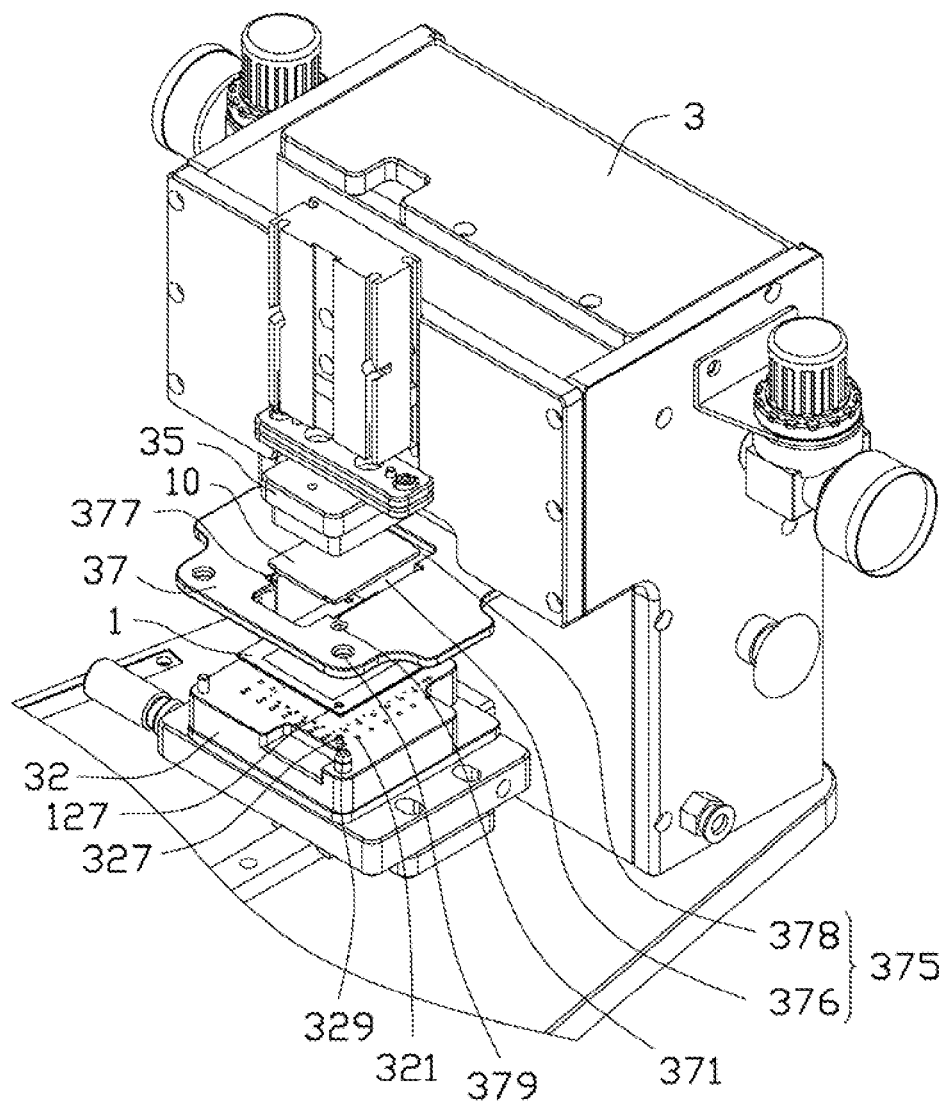
FIG. 8 is an isometric view of part of an exemplary assembling device used for attaching the buffer assembly of the one embodiment to the display panel of FIG. 5, the assembling device including a cover board, and showing the buffer assembly and the display panel.

Referring to FIG. 8, an isometric view of part of the assembling device 3 is shown. The assembling device 3 includes a supporting platform 32, a cover board 37, and a head 35. The supporting platform 32 is used to support the buffer assembly 1. The cover board 37 defines a rectangular opening 376 therein, for allowing the display panel 10 to pass therethrough. The cover board 37 is used to cover a part of the strength enhanced portion 199 of the buffer assembly 1. The head 35 is used to apply a force on the display panel 10.

Two position poles 327, a plurality of position protrusions 329, and a plurality of drawing holes 321 are disposed on the supporting platform 32. The position poles 327 correspond to the position holes 127 of the buffer assembly 1. The drawing holes 321 may be vacuum holes.

The cover board 37 is disposed above and corresponds to the supporting platform 32. An area of the cover board 37 (including the area of the rectangular opening 376) is more than that of the buffer assembly 1. The cover board 37 includes a position portion 375 defined at a center thereof. The position portion 375 is used to receive the display panel 10, and includes the rectangular opening 376 and two or more operating spaces 378. The cover board 37 further includes a plurality of abutting terminals (or feet) 377 extending down from an internal periphery of the position portion 375 adjacent to the opening 376. Two operating spaces 378 are employed in this embodiment. The two operating spaces 378 are disposed at two opposite sides of the opening 376. A shape and a size of the opening 376 are designed to allow the display panel 10 to pass therethrough and be precisely received in the cover board 37, for positioning the display panel 10 for the adhering operation. The operating spaces 378 provide operating room for placing the display panel 10 in the opening 376. The operating spaces 378 can also allow a gap to be maintained between the display panel 10 and two opposite inner sides of the cover board 37 at the opening 376, to prevent circuit wiring at the border portion 19 from being abraded. In alternative embodiments, three or more operating spaces 378 can be defined in the cover board 37.

The cover board 37 further defines a plurality of first position holes 379 corresponding to the position protrusions 329 of the supporting platform 32, and two second position holes 371 corresponding to the position poles 327 of the supporting platform 32. The first position holes 379 receive the position protrusions 329, and the second position holes 371 receive the position poles 327, to fix the cover board 37 to the supporting platform 32.

In step S2', the buffer assembly 1 is fixed to the assembling device 3. The buffer assembly 1 is placed on the supporting platform 32, and is fixed to the supporting platform 32 via the position poles 327 being received in the position holes 127. Further, the drawing holes 321 can be used to draw and hold the buffer assembly 1 in position.

In step S3', the first release portion 122 of the release paper 12 is peeled from the buffer assembly 1. The first release portion 122 of the release paper 12 is peeled from the buffer assembly 1 by grasping the extension end 126, and the peeling occurs along the third cutting line 123. After the first release portion 122 has been peeled off, the first and the second openings 160, 140 and the first adhesive portion 149 are exposed.

In an alternative embodiment, the order of performing step S2' and step S3' can be reversed. That is, step S3' can be performed before step S2'.

Figure 9:
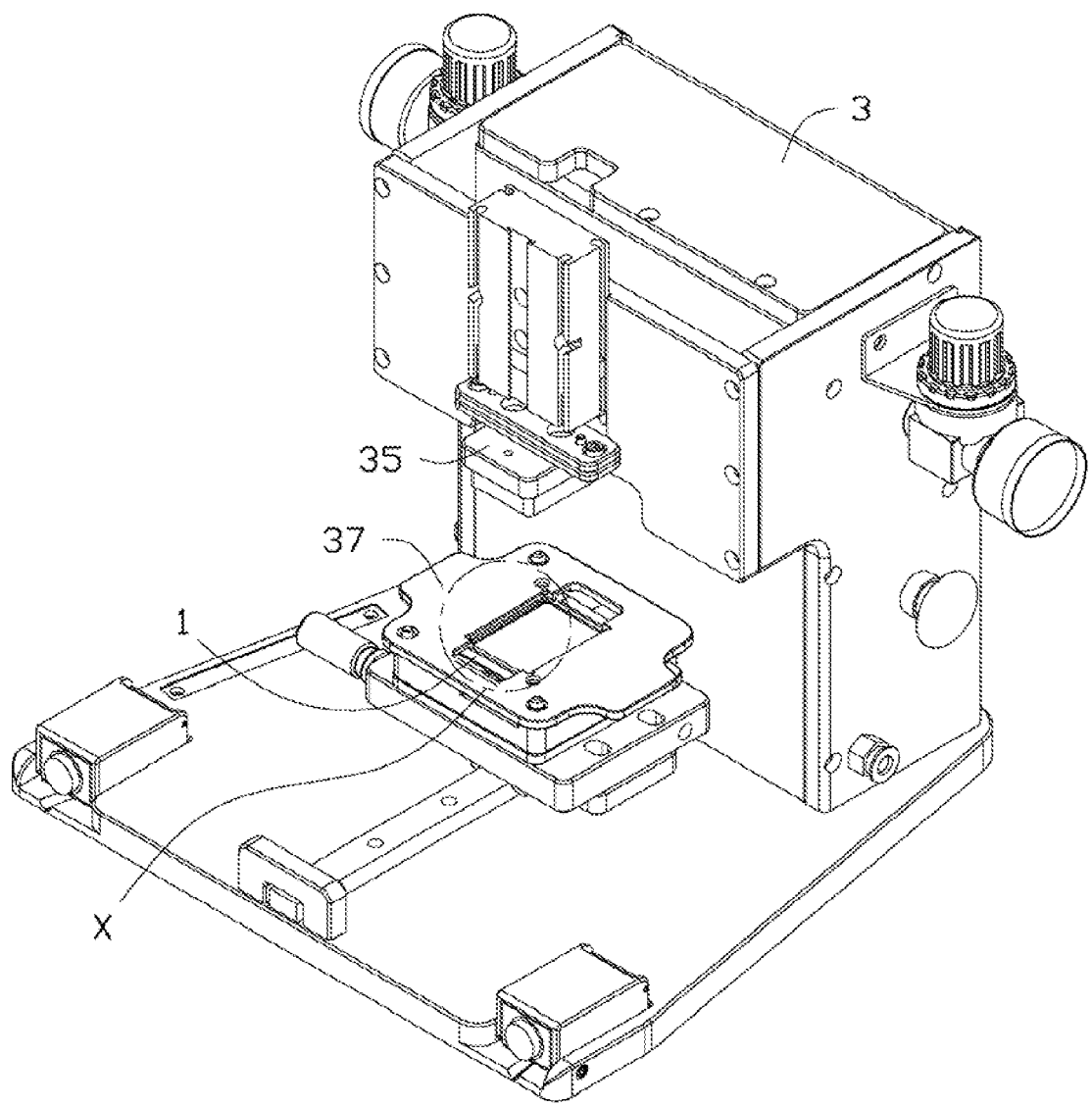
FIG. 9 is similar to FIG. 8, but showing the buffer assembly covered by the cover board, and not showing the display panel.
Figure 10:
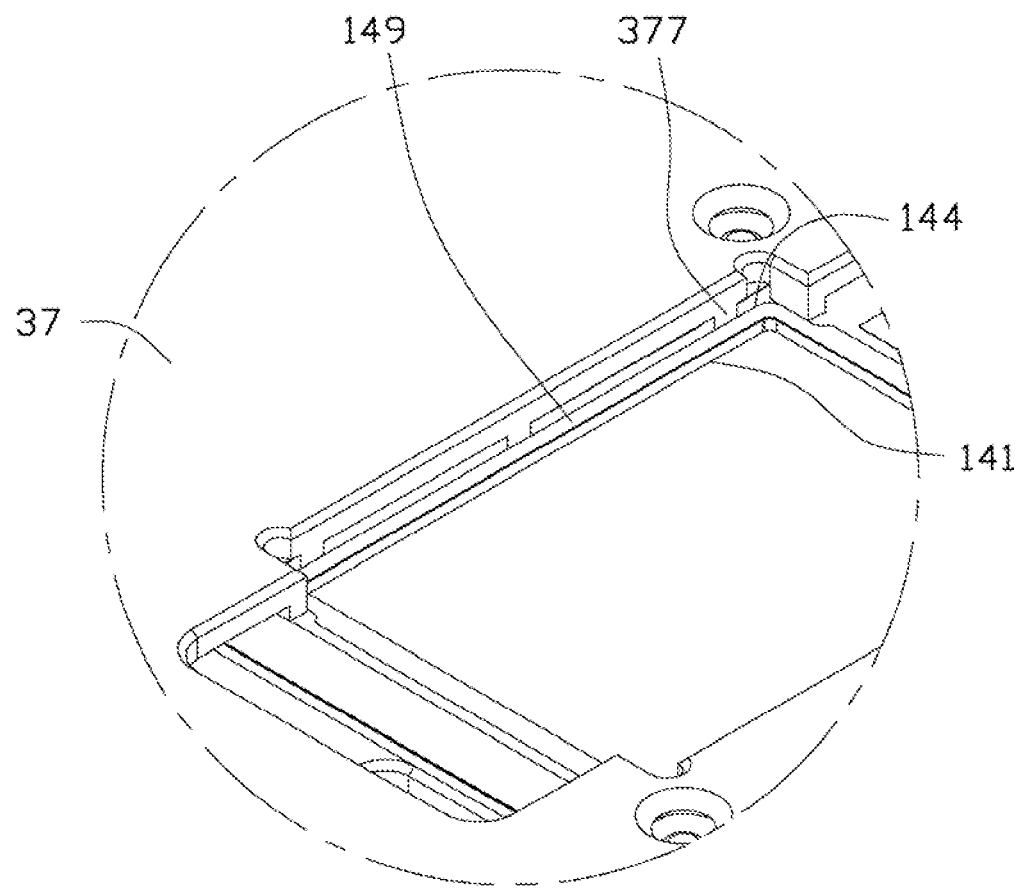
FIG. 10 is an enlarged view of a circled part X of FIG. 9.

In step S4', the buffer assembly 1 is aligned with and adhered to the display panel 10. Referring to FIGS. 9-10, after the first release portion 122 of the release paper 12 is peeled from the buffer assembly 1, the cover board 37 covers the buffer assembly 1, and is fixed to the supporting platform 32 by the position poles 327 being received in the second position holes 371 and the position protrusions 329 being received in the first position holes 379. Thereby, the abutting terminals 377 abut parts of the second release portion 121 adjacent to and surrounding the third cutting line 123, and the first adhesive portion 149 is exposed by the opening 376. Thus the abutting terminals 377 also hold in place parts of the adhesive layer 14 adjacent to and surrounding the second cutting line 144, and parts of the buffer body 16 adjacent to and surrounding the first cutting line 164. That is, the cover board 37 presses and flattens the buffer assembly 1 via the abutting terminals 377. This enables the buffer assembly 1 and the display panel 10 to be well aligned with each other.

Then the display panel 10 is received in the opening 376 and is positioned by the position portion 375. Thereby, the border portion 19 is opposite to and abuts the first adhesive portion 149. The assembling device 3 is operated so that the head 35 applies a force to the display panel 10, and accordingly the display panel 10 is adhered to the first adhesive portion 149 of the buffer assembly 1.

Figure 11:
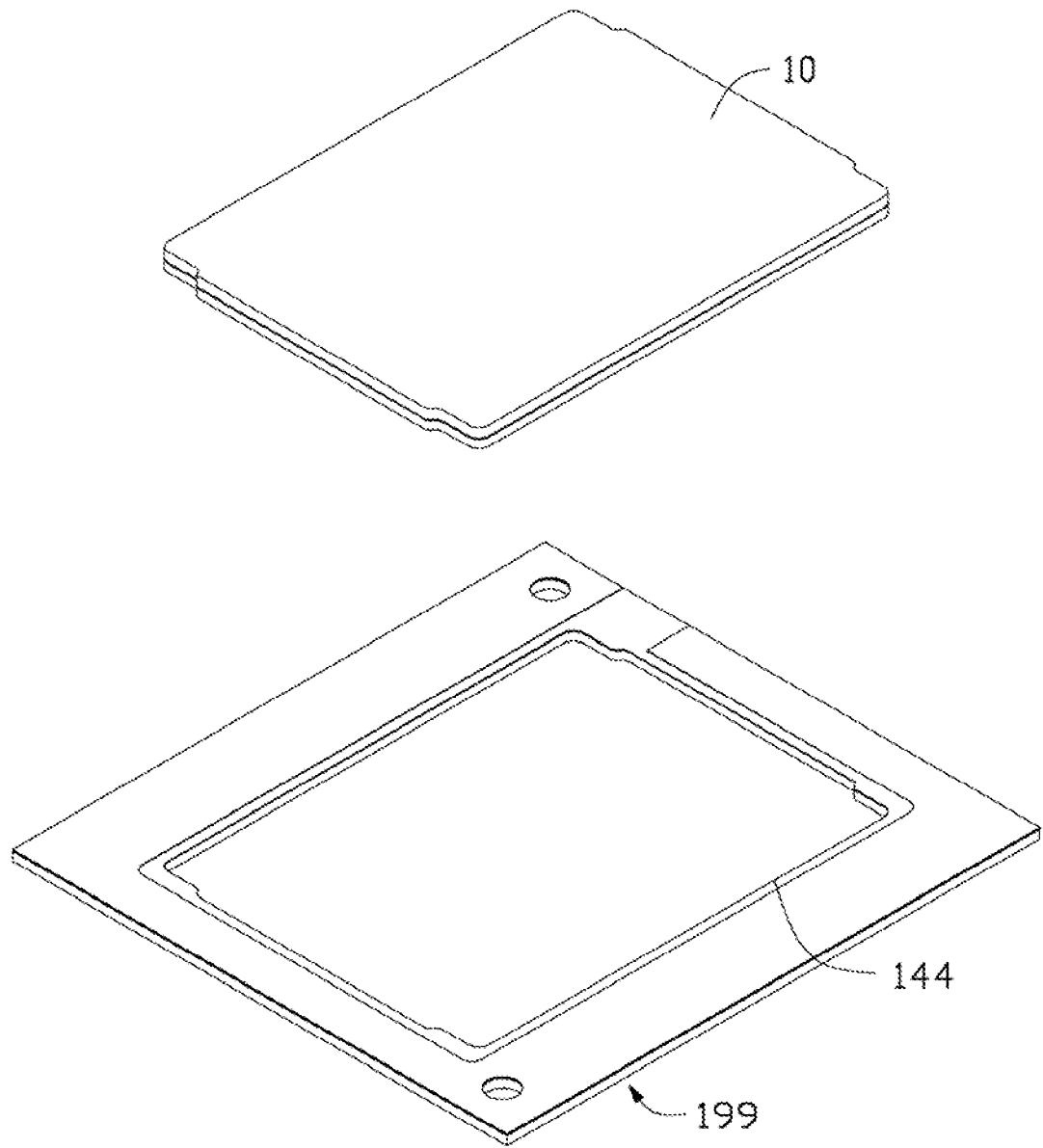
FIG. 11 is an isometric view of the display panel of FIG. 5 with an adhesive layer of the buffer assembly adhered to a bottom thereof (as viewed in FIG. 11), also showing remaining portions of the buffer assembly separate from the display panel.

In step S5', the strength enhanced portion 199 is split from the buffer assembly 1. After the buffer assembly 1 is adhered to the display panel 10, the head 35 is raised free from the display panel 10, the cover board 37 is taken off and away from the supporting platform 32, and the display panel 10 with the buffer assembly 1 is also taken off and away from the supporting platform 32. Referring to FIG. 11, the strength enhanced portion 199 is split from the buffer assembly 1 along the first and second cutting lines 164, 144. Thereby, the display panel 10 having the buffer portion 169 accurately and tightly attached thereto via the first adhesive portion 149 is obtained.

In an alternative embodiment, the cover board 37 can be omitted. In such case, the display panel 10 is positioned over and onto the buffer assembly 1 manually.

It is believed that the present embodiments and their advantages will be understood from the foregoing description, and it will be apparent that various changes may be made thereto without departing from the spirit and scope of the embodiments or sacrificing all of their material advantages.

What is claimed is:

1. A buffer assembly comprising:
   a buffer body, the buffer body comprising a buffer portion and a mounting portion surrounding the buffer portion; and
   an adhesive layer on the buffer body, the adhesive layer comprising a first adhesive portion and a second adhesive portion surrounding the first adhesive portion, the first adhesive portion and the second adhesive portion respectively corresponding to the buffer portion and the mounting portion;
   wherein a first cutting line is disposed between the buffer portion and the mounting portion such that the mounting portion is separable from the buffer portion along the first cutting line, and a second cutting line is disposed between the first adhesive portion and the second adhesive portion such that the second adhesive portion is separable from the first adhesive portion along the second cutting line, the second cutting line superposing the first cutting line,
   wherein the buffer portion comprises a first opening which is defined by an internal edge of the buffer portion, the first adhesive portion comprises a second opening which is defined by an internal edge of the first adhesive portion, the first opening is corresponding to the second opening, the first cutting line is surrounding the first opening and defines a first closed region, an area of the first close region is greater than an area of the first opening, the second cutting line is surrounding the second opening and defines a second closed region, and an area of the second closed region is greater than an area of the second opening.

2. The buffer assembly of claim 1, further comprising a release paper, wherein the release paper is attached to the buffer body via the adhesive layer.

3. The buffer assembly of claim 2, wherein the release paper comprises a first release portion and a second release portion, and the first release portion comprises a main body substantially surrounded by the second release portion and an extension end extending from the main body and protruding out beyond the second release portion.

4. The buffer assembly of claim 3, wherein a third cutting line is disposed between the main body and the second release portion such that the first release portion is separable from the second release portion via the extension end and along the third cutting line.

5. The buffer assembly of claim 1, wherein a shape and an area of the second opening is substantially equal those of the first opening, and a shape and an area of the first adhesive portion is substantially equal those of the buffer portion.

6. The buffer assembly of claim 4, further comprising two position holes at two diagonally opposite corners thereof.

7. The buffer assembly of claim 4, wherein the third cutting line is surrounding the first cutting line and the second cutting line, and the third cutting line defines a non-close region, an area of the non-close region is greater than the area of the first closed region and the area of the second closed region.

* * * * *